Nov. 5, 1935.  R. SCHWEICH  2,020,002
PACKING
Filed June 14, 1933
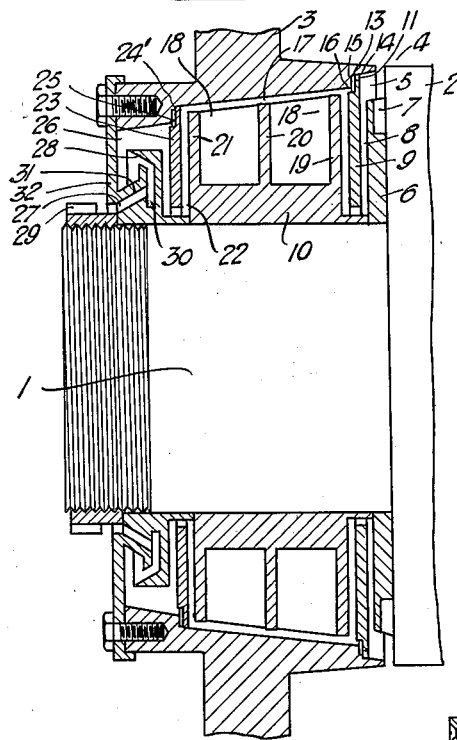
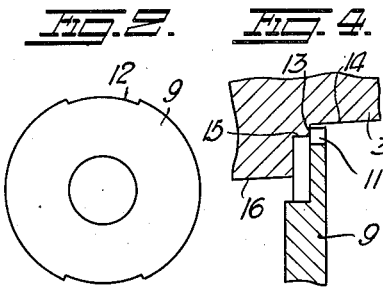
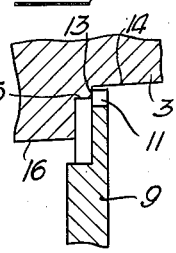
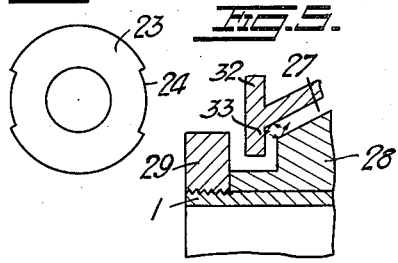
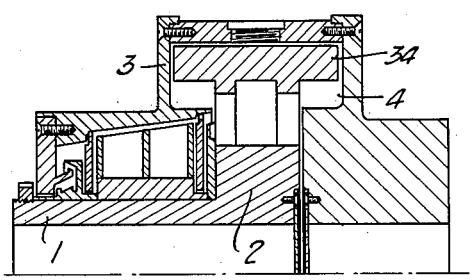
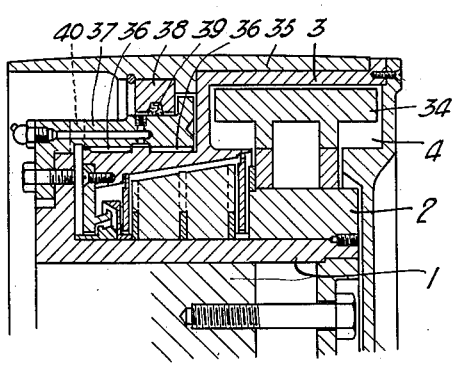
INVENTOR
Roger Schweich
BY
his ATTORNEY Patented Nov. 5, 1935

2,020,002

UNITED STATES PATENT OFFICE 2,020,002

PACKING

Roger Schweich, Paris, France, assignor to Pulvis Aktiengesellschaft, Glarus, Switzerland, a corporation of Switzerland Application June 14, 1933, Serial No. 675,775
In France June 23, 1932

11 Claims. (Cl. 286—5)

This invention has for its object to provide a packing with clearance for preventing the leakage of a liquid, powdered or granular material of such a nature as to be subjected to a loss of pressure in traversing narrow passages. The packing according to the invention is adapted to be inserted between two rotary parts capable of mutual displacements in various directions, as, for instance, circumferentially, axially and radially.

The invention relates more particularly to automatic slipping clutches of the kind in which a driven member in the shape of a casing is driven, through the intermedium of a powdered or granular mass contained in the casing, by a driving blade carrying member rotating within the casing. In this type of clutch, the means to prevent leakage of the granular or powdered material comprises, as a rule, a felt packing which does not afford any clearance, nor allows any movements in axial or radial direction of the driving and driven members with respect to each other so that, when it is desired to use such a clutch for driving a machine on a line with the driving motor, it is necessary to let the clutch drive an elastic or semi-elastic coupling in order to render the connection between the driving and the driven shafts more or less flexible in axial and radial directions. By the use of a clutch according to the present invention, which affords a clearance, the provision of an elastic or semi-elastic coupling may be avoided, which, consequently, means a material simplification. The slipping clutch, instead of driving a machine on a line with the driving motor, may be combined with a pulley to drive the machine by the aid of a belt.

Furthermore, in a clutch coupling according to the invention there is no need of metallic bushings to be carried by the driven member and to rotate on the hub of the driving blades and, likewise, no need of the corresponding lubrication, as the invention introduces ample clearances in all directions between the driving and the driven members of the clutch coupling.

The packing device according to the invention has for its purpose, on the one hand, to prevent the granular or powdered material from escaping through the leakage passages and, on the other hand, to restore by the aid of the centrifugal force, to the interior of the clutch any of the material which has succeeded in traversing said leakage passages.

The invention resides, principally, in a combination of the following features:

1. The provision of baffles to repress leakage when slippage is taking place at low speed between the driving and the driven members of the clutch;

2. The provision of conical chambers the apexes of which face outwardly in such a way as to allow the centrifugal force to restore to the interior of the clutch any of the material which has succeeded in passing by the baffles, passages of a constant small cross section area being provided substantially directly between the conical chambers;

3. The provision of blade carrying members rotating within the conical chambers in order to throw the powdered material against the periphery of said chambers, the conical chamber next to the outer end of the clutch, however, containing no such member in order to avoid the risk of the granular or powdered material rebounding through the outlet opening.

The baffles are of two kinds: peripheral and radial. The peripheral baffles are provided between conical and disk shaped parts which are related to the driven clutch member so that the passages afforded by said baffles will be independent of the relative movements of the driving and driven members with relation to each other. This system of peripheral baffles is characterized by three conical surfaces having a common axis and the same angle, but different apexes, the generatrices of said conical surfaces being in one way arranged in step-like relation to each other. By this feature, the provision of a leakage passage along a single continuous generatrix may be avoided, which would otherwise be obtained if but one conical surface were provided.

These steps effect changes of the direction of movement of the leakage material and, thus, cause an increase of the losses of pressure between the cone and the disk. The radial baffles are provided between the disk connected to the driven cone above referred to and two disks connected to the driving member, the said first-mentioned disk being positioned in the space between said two disks, while affording ample clearances in all directions in order to allow relative displacements in axial and radial directions between the driving and the driven members of the clutch.

In the accompanying drawing, Fig. 1 is an axial section of a packing according to the invention as applied to a clutch coupling of the above stated type, Figs. 2 and 3 are detail views on a smaller scale, Figs. 4 and 5 are axial sections of details on a larger scale, and Figs. 6 and 7 are axial sections of the upper half of packings according to the invention as applied to clutches containing a granular or powdered power transmitting medium to drive a machine on a line with the driving motor, Fig. 6, or to drive a machine with the aid of a belt transmission, Fig. 7.

In the embodiment shown in Fig. 1, the packing according to the invention is mounted on the hub 1 of the driving clutch member 2 between said hub 1 and the casing 3 forming part of the driven clutch member. The chamber containing the powdered or granular power transmitting material is shown at 4. Said chamber 4 communicates with a first conical chamber 5 within which rotates a baffle disk 6 having blades 7 which is rigidly connected to the driving member 1—2. On the side of the chamber 5 remote from the chamber 4, a first passage 8 formed between baffle disks 6, 9 and 19 is provided between the conical chamber 5 and a chamber 17. Disks 6 and 19 are rigidly secured to hub 1, while disk 9 is secured to casing 3. Other passages 11 are provided at certain parts of the periphery of the chamber 5. Said passages 11 are situated between the baffle disk 9 and the member 3 and are formed by recesses 12 in the peripheral edge of the disk 9 which extend along arcs of suitable length of the periphery of the disk. The disk 9 rests with its periphery against an offset 13 of the member 3. Casing 3 is provided with peripheral baffles formed by three conical surfaces 14, 15, 16 of steplike arrangement, as shown particularly in Fig. 4.

From passage 8, the material enters chamber 17 within casing 3, the inner surface of which is conical with the apex facing away from the clutch chamber. This chamber 17 is divided into two compartments by radial disks 19, 20 and 21 secured to a member 10 mounted on hub 1. Blades 18 are situated between the disks 19, 20 and 21.

The centrifugal force transmitted by the blades 18 to the granular or powdered material contained in the chamber 17 tends to throw said material towards the periphery, and owing to the conical shape of the chamber 17, the material, when thus acted on, is caused to slide towards the base of the cone, that is, towards the interior of the clutch and passes through the narrow peripheral passages 11 into chamber 4. As will appear from the drawing, said peripheral passages 11 are of a very restricted but constant area due to the fact that the passages are provided between two rigidly connected parts, while the passage 8 between the radial baffles is of a larger area corresponding to the clearances desired, which may vary in conformity with the relative displacements of the driving and driven clutch members.

Provided at the outlet end of the chamber 17 is another passage 22 having radial baffles, said passage being produced by the aid of a disk 23 similar to the disk 9 and arranged in a similar way, but so related thereto that the recesses 24 at the periphery of the disk 23 (see Fig. 3) are displaced 90 degrees with relation to the peripheral recesses 12 of the disk 9. Said disk 23 bears with its periphery against an offset 24' of the member 3 to which it is secured. The passage 22 and the peripheral passages 25, the arrangement of which is similar to that of the peripheral passages 11, lead to a conical chamber 26 which communicates with the atmosphere through an annular, conical passage 27 protected by a restoring cone 28, the arrangement of which will clearly appear from the drawing.

The parts 6, 10 and 28 are all carried by the hub 1 of the driving member 2 and are held thereto by a nut 29 engaging the threaded end of the hub. This method of attaching will be sufficient, because there are no stresses worth mentioning acting on the packing device.

It is easy to realize the operation of the packing device in case of a solid finely divided material by considering, on the one hand, the great losses of pressure to which the material is subjected when traversing a narrow passage along a broken path, and, on the other hand, the slope which due to the outwardly decreasing cross section area of the conical chamber is formed on the internal surface of the same.

When the material that has traversed the passages 8 or 11 enters the chamber 17, it has been subjected to great losses of pressure. Said material will partially fill the compartments of the chamber 17, and the provision of the baffles 19, 20 and 21, that is to say, the dividing of the chamber 17 into two compartments, results in maintaining the quantity of material collected in front of the outermost wall 21 of the chamber considerably smaller than would be the case if the chamber were not divided, because the walls 20 and 21 will each intercept a portion of the material. Furthermore, the blades 18 accomplish the action just described, and have for their particular purpose to throw the material radially outwards upon the rotation of the member 2. The granules will then be thrown against the inner surface of the member 3 and, due to the conical shape of said surface, they will tend to slide along the same under the action of the centrifugal force and are thus caused to return to the chamber 4 through the passages 11. If there is leakage also at the outer end of chamber 17, said leakage takes place through the passages 22 and 25, in the same way as already described in connection with the passages 8 and 11, and the material which has thus succeeded in traversing the passages 22 and 25, will collect in the chamber 26 which is in communication with the atmosphere. As the passage leading from said chamber to the atmosphere is protected by the restoring cone 28, the material will be prevented from escaping directly through said passage 27, and the centrifugal force will, upon the rotation of the member 2, force this material along the conical inner surface of the member 3 and restore it from the chamber 26 back into the chamber 17 through the passages 25. In order to reduce the possibility of leakage through the passage 27, the inlet of said passage extends perpendicularly to the axis and ends in a groove 30 formed in the member 28. From said groove, the granules may be driven out into the chamber 26 under the action of the centrifugal force while sliding on the conical surface of the member 28. Those few granules which might enter the passage 27 by being rebounded thereinto, will be thrown back again by the action of the conical inner surface 31 of the member 32 closing the chamber 26.

Finally, the outlet opening of the passage 27 may be covered by a very flexible disk (as, for instance, a steel disk) attached to the outer side the member 32. In such case, the border of the outlet of the passage 27 facing the axis ought to be conical so as to afford a supporting surface to the border of the central opening of the disk.

If desired, means may be provided at the outlet of the passage 27 to restore by a rebounding action those few granules which might still reach the outlet in spite of the other arrangements provided. Said means, which is illustrated in Fig. 5, comprises, essentially, a flange 33 on the member 32 which extends between the member 28 and the nut 29. Apart from its function of restoring, by a rebounding action, those granules which reach the outlet of the annular passage 27, said means may also facilitate the controlling of the axial adjustment, by observing the distance between member 32 and nut 29, and the controlling of the radial adjustment, by observing the position of an incision on the outer side of member 32 with relation to the nut 29.

Fig. 6 shows an embodiment of the invention as applied to a clutch coupling for driving a machine by a motor on line with said machine. The motor is rigidly connected to the members 1—2, while the machine to be driven is rigidly connected to the member 3. The blades 34 of the clutch coupling which are connected to the member 2 rotate within the working chamber 4. To the left of the drawing, a packing device is shown which corresponds to that shown in Fig. 1.

Fig. 7 shows an example of the use of the invention in connection with a clutch combined with a pulley for driving a machine by means of a belt. The driving element is indicated by the reference numerals 1—2, and the driven element is indicated by the numeral 3. The blades 34 of the clutch pulley rotate within the working chamber 4 which is provided with a packing device similar to that shown in Fig. 1. The rim 35 of the pulley is rigidly connected to the member 3, and inserted between the driving member 1 and the driven member 3 are needle bearings 36, the inner needle races of which are provided on the member 3 and the outer needle races of which are provided on the member 37 rigidly connected to the member 1. The means for oiling these needle bearings have also for their purpose to effect the oiling of a double acting thrust bearing, represented by the member 37, one end of which is formed with a flange engaging the space between the member 3 and the member 38 rigidly connected to the driven element. Said device permits suppression of the axial effects of the creeping of the belt. A felt packing 39 provided in the member 38 prevents the entering of dust from the atmosphere, and prevents the leakage of lubricating oil from the bearings and the flange too. Apertures 40 formed in the member 37 are provided to allow the escape of metallic dust and surplus of lubricating oil to the atmosphere.

Though the invention has been hereinbefore described in connection with a clutch of the type set forth, it is evident that the packing device may be used, without departing from the principle of the invention, for preventing leakage of other material than a granular or powdered one used in connection with a clutch, as well as for preventing leakage from between two different parts, without the need of the one part being a driving one and the other part being a driven one.

Modifications may also be made in respect of the details of the device. Thus, for instance, it is not necessary to provide the member 6 with small blades 7.

What I claim is:—

1. The combination with two rotatable members formed with a space therebetween for receiving finely divided solid material, said members being capable of rotation at different speeds, of means for preventing the escape of said material from said space including means forming a chamber adjacent to said space, a plurality of rotatable baffles separating said space from said chamber, said baffles being arranged with clearance therebetween, and means in said chamber for returning to said space finely divided material which has passed into said chamber through said clearance.

2. The combination with two rotatable members formed with a space therebetween for receiving finely divided solid material, said members being capable of rotation at different speeds, of means for preventing the escape of said material from said space including means forming a chamber adjacent to said space, a plurality of rotatable baffles separating said space from said chamber, said baffles being arranged with clearance therebetween, and one of said baffles having a passage of small cross-sectional area formed therethrough and communicating with said space, and means in said chamber for returning to said space through said passage finely divided material which has passed into said chamber through said clearance.

3. The combination with two rotatable members formed with a space therebetween for receiving finely divided solid material, said members being capable of rotation at different speeds, of means for preventing the escape of said material from said space including means forming an annular chamber adjacent to said space, said chamber being bounded by a rotatable outer wall sloping radially outward towards said space, a plurality of rotatable baffles separating said space from said chamber, said baffles being arranged with clearance therebetween, one of said baffles having a passage of small cross-sectional area formed therethrough adjacent to said outer wall, and means for moving finely divided material, which has passed into said chamber through said clearance, outwardly to said rotatable sloping wall whereby centrifugal force causes the material to travel along the sloping wall and through said passage back into said space.

4. The combination with two rotatable members formed with a space therebetween for receiving finely divided solid material, said members being capable of rotation at different speeds, of means for preventing the escape of said material from said space including means forming a chamber adjacent to said space, a plurality of rotatable baffles separating said space from said chamber, said baffles being arranged with clearance therebetween, a conical wall formed by one of said rotatable members and bounding a conical chamber adjacent to said space, said wall sloping radially outward towards said space, a radial baffle carried by said one of said rotatable members and defining the base of said conical chamber, a second radial baffle carried by the other of said rotatable members and spaced with axial clearance from the first baffle, said first baffle having an axially extending passage adjacent the periphery thereof, and means for moving finely divided material, which has passed into said chamber through said clearance, outwardly to said rotatable conical wall whereby centrifugal force causes the material to travel along the conical wall and through said passage back into said space.

5. The combination with two rotatable members formed with a space therebetween for receiving finely divided solid material, said members being capable of rotation at different speeds, of means for preventing the escape of said material from said space including means forming a chamber adjacent to said space, a plurality of rotatable baffles separating said space from said chamber, said baffles being arranged with clearance therebetween and one of said baffles having a passage of small cross-sectional area formed therethrough and communicating with said space, means in said chamber for returning to said space through said passage finely divided material which has passed into said chamber through said clearance, and additional baffle means adjacent to one end of said passage for hindering movement of finely divided material through said passage from said space to said chamber.

6. The combination with two rotatable members formed with a space therebetween for receiving finely divided solid material, said members being capable of rotation at different speeds, of means for preventing the escape of said material from said space including means forming a chamber adjacent to said space, a plurality of rotatable baffles separating said space from said chamber, said baffles being arranged with clearance therebetween, a conical wall formed by one of said rotatable members and bounding a conical chamber adjacent to said space, said wall sloping radially outward towards said space, a radial baffle carried by said one of said rotatable members and defining the base of said conical chamber, a second radial baffle carried by the other of said rotatable members and spaced with axial clearance from the first baffle, said first baffle having an axially extending passage adjacent the periphery thereof, means for moving finely divided material, which has passed into said chamber through said clearance, outwardly to said rotatable conical wall whereby centrifugal force causes the material to travel along the conical wall and through said passage back into said space, and additional baffle means adjacent to one end of said passage for hindering movement of finely divided material through said passage from said space to said chamber.

7. In a clutching device, a member providing a casing, a second member rotatably mounted in said casing, said members providing therebetween a chamber to receive a finely divided material and a set of conical chambers tapering to the side remote from said first-mentioned chamber, baffles between the various chambers to provide a leakage passage therebetween, peripheral passages between said chambers, baffle surfaces in connection with said peripheral passages, the peripheral passages of succeeding chambers being displaced circumferentially with relation to each other, and means in the conical chambers to move the material, that has entered said chambers through the leakage passage, towards the periphery of said chambers whereby it is caused to return by the action of centrifugal force to said first-mentioned chamber through said peripheral passages.

8. In a clutching device, a member providing a casing, a second member rotatably mounted in said casing, said members providing therebetween a chamber to receive a finely divided material and a set of conical chambers tapering to the side remote from said first-mentioned chamber, baffles between the various chambers to provide a leakage passage therebetween, peripheral passages between said chambers, baffle surfaces in connection with said peripheral passages, and rotary blades in the conical chambers except the outermost one to move the material, that has entered said chambers through the leakage passage, towards the periphery of said chambers whereby it is caused to return by the action of centrifugal force to said first-mentioned chamber through said peripheral passages.

9. In a clutching device, a member providing a casing, a second member rotatably mounted in said casing, said members providing therebetween a chamber to receive a finely divided material and a set of conical chambers tapering to the side remote from said first-mentioned chamber, baffles between the various chambers to provide a leakage passage therebetween, peripheral passages between said chambers, baffle surfaces in connection with said peripheral passages, an outlet passage to connect the outermost conical chamber with the atmosphere, means in the conical chambers except the outermost one to move the material, that has entered said chambers through the leakage passage, towards the periphery of said chambers whereby it is caused to return by the action of centrifugal force to said first-mentioned chamber through said peripheral passages, and means in said outermost chamber to prevent finely divided material from escaping through said outlet passage.

10. In a clutching device, a member providing a casing, a second member rotatably mounted in said casing, said members providing therebetween a chamber to receive a finely divided material and a set of conical chambers tapering to the side remote from said first-mentioned chamber, annular disks attached to said casing so as to provide a leakage passage between each two adjacent chambers, said disks being formed with recesses at their outer peripheries, the casing being formed with a plurality of conical surfaces of step-like arrangement adjacent each such disk, means in the conical chambers to move the material that has entered said chambers through the leakage passage, towards the periphery of the chambers whereby it is caused to return by the action of the centrifugal force to said fiirst-mentioned chamber through the peripheral recesses.

11. In a clutching device, a member providing a casing, a second member rotatably mounted in said casing, said members providing therebetween a chamber to receive a finely divided material and a set of conical chambers tapering to the side remote from said first-mentioned chamber, baffles between the various chambers arranged to provide leakage passages therebetween, peripheral passages between said chambers, baffle surfaces in connection with said peripheral passages, an outlet passage to connect the outermost conical chamber with the atmosphere, rotary blades in the conical chambers except the outermost one to move the material, that has entered said chambers through the leakage passage, towards the periphery of said chambers whereby it is caused to return by the action of centrifugal force to said first-mentioned chamber through said peripheral passages, means in said outermost chamber to prevent finely divided material from escaping through said outlet passage, and means for indicating the radial and axial adjustments of said members with respect to each other.

ROGER SCHWEICH.